Patented June 30, 1942

2,287,838

UNITED STATES PATENT OFFICE 2,287,838

METHOD OF MANUFACTURING CONFECTION AND PRODUCT

Joseph Stanley, Jackson Heights, N. Y., assignor to American Lecithin Company, Cleveland, Ohio, a corporation of Ohio No Drawing. Application October 17, 1938,
Serial No. 235,450

20 Claims. (Cl. 99—23)

The present invention relates to confections and similar edible products containing fat or oil, and more particularly relates to an edible product in which a solid comminuted material is dispersed in a fat which contains substantially no moisture, or as may be the case in certain compounds the dry comminuted ingredients are dispersed in the fat in the presence of a small amount of moisture at higher temperatures.

In foods where an oil or fat is mixed with a comminuted solid the problem is essentially one of mixing. For example, in the manufacture of chocolate enrobing mixtures for enrobing candies and other confections; it is customary to mix powdered sugar, chocolate liquor and cocoa butter with or without powdered milk, while heating to produce a fluid mass of chocolate. In the case of a chocolate substitute, hydrogenated cocoanut oil or similar fat may be substituted in whole or in part for the cocoa butter. In a normal desirable mixture of these ingredients the viscosity is ordinarily too high to provide proper working qualities and to provide quick mixing of a satisfactory nature, unless a suitable ingredient is included to lower the viscosity or an undesirably high amount of the fat is employed.

Similarly in the manufacture of icings, where powdered sugar is mixed with a fat relatively low viscosities are desirable for both the mixing and the relatively low temperatures at which they are applied. Likewise in the case of such confections as caramels, fudges, toffees, fillings, etc. in which the fat is heated at a high temperature and the comminuted solids, such as sugar are dispersed therein in the presence of a small amount of water, it is desirable to have present an emulsifying agent which will produce stable emulsions at the elevated temperatures employed, and which will also act to reduce the viscosity. The temperature employed may reach as high as 275 to 285° F. and the addition of a suitable ingredient not only reduces the viscosity but also acts as an emulsifying agent at these elevated temperatures.

The principal object of the present invention is to improve the edible compositions of the type described above.

Another object is to provide a new ingredient for such compositions.

Another object is to reduce the viscosity of compositions of the type described.

Another object is the utilization of an improved emulsifying agent in toffee, caramels, fudges, fillings and the like which are heated to a relatively high temperature.

Other objects will be apparent from the detailed description which follows.

Phosphatides, such as lecithin particularly that extracted from soya beans, has been used in confectionery manufacture as an interface, capillary, and colloid agent. For example, in chocolate manufacture small percentages of lecithin, around 0.25% have been found to affect beneficially the viscosity of the chocolate. That is, such small additions of lecithin lower the viscosity of the melted chocolate, and confer to the chocolate other beneficial working and keeping qualities. These beneficial properties center about the fact that lecithin enables one to manufacture chocolate of a given viscosity of lower cocoa-butter content largely because of the wetting properties of licithin. For the purpose of this description chocolate may be regarded as a suspension of finely comminuted cacao matter, sugar, and other edible solids in cocoa butter, with or without the addition of milk powder. In imitation chocolate, part or all of the cocoa butter is replaced by substitute fats. This invention also covers similar suspensions without cacao matter such as caramels, toffees, butter creams, fudges, icings, fillings, etc. in which at least one pulverulent ingredient is dispersed in a fatty material.

The function of the lecithin or other phosphatide is to improve, accelerate, and complete the wetting of such finely comminuted solids by the suspending melted fat. It is commonly conceded that lecithin acts as such a wetting agent because of the "balanced" disposition of the "lipophile" and "hydrophile" groups composing the lecithin molecule.

In my copending application, Serial No. 234,784, filed October 13, 1938, for "Confection composition and method of manufacture," I have disclosed the use of certain salts containing both hydrophilic and lipophilic groups, and in which the positive group or atom is the hydrophilic group and the negative group is the lipophilic group. The salts which are suitable are the innocuous salts of fatty acids containing more than six carbon atoms, or the substitution or addition products of such acids, in which the positive ion is of a hydrophilic nature. The positive ions may be metallic, such as an alkali metal, alkaline earth metal, aluminum, iron, etc.; metalloidal ions such as boron; metanyl ions such as bismuthyl; $NH_4$; organic amine ions, such as monoethanolamine; alkaloidal ions such as the caffeine ion; and organic ions such as sterols, among which may be mentioned the cholesterol ion. The negative ion may be any fatty acid residue containing more than six carbon atoms, it may be saturated or unsaturated, and it may be a hydroxy, polycarboxylic, oxidized, halogenated, sulphated, sulphonated, phosphated, phosphonated, or aminated fatty acid residue. Among the negative ions may be mentioned the ions of the following acids: caproic, capric, capryllic, abietic, hydroxystearic, palmitic, stearic, lauric, melissic, oleic, myristic, ricinoleic, or mixed fatty acids derived from animal, vegetable or fish sources, such as lard, cocoanut oil, corn oil, soya oil, olive oil, teased oil or partially or completely hydrogenated vegetable oils such as cottonseed oil, soya oil, corn oil, or the fatty acids of various waxes such as carnauba wax, beeswax, Japan wax, etc. Also, the negative ion need not be the residue of a single acid, but may be of a complex nature such as in the case of ferric stearate oleate linoleate. In fact in compounds of this nature one of the fatty acid residues of the negative ion may be a residue more hydrophilic in character such as in the case of ferric stearate oleate acetate.

It is not necessary that the salts be neutral, as it has been found that basic salts of the above fatty acids are effective and even acid salts may be used where they are stoichiometrically possible. Mixtures of the salts may be used.

It has now been found that if a salt or salts of the type disclosed in my copending application referred to above is admixed with lecithin or other phosphatide that results are obtained which are not found when these materials are used singly. It has been found that when using the salts of the class described below, and particularly when using the soaps, in the manufacture of chocolate and similar compositions, that the chocolate does not temper well. For example, in the case of dipping chocolate, the chocolate mix cannot just be melted and the confection or other article dipped, as the coating will whiten or bloom. It is necessary to first heat the mix, and then slowly cool with agitation to effect a partial crystallization of the higher melting point fats.

It has been found that when using the salts, especially the water insoluble soaps described above in chocolate that frequently this tempering is retarded and in some cases becomes almost impossible. I have found, however, that a mixture of lecithin and these salts tempers very easily and that such a mixture has a greater viscosity reducing action than lecithin alone.

According to the invention a mixture was prepared of aluminum oleate and lecithin, in a fatty carrier and having the following composition:

Pounds
Aluminum oleate__ 250 ⎫
Stearic acid_____ 76 ⎬ 60–67% aluminum oleate in a fatty carrier
Cocoa butter_____ 90 ⎭
Lecithin_____416 } 60–67% lecithin in soya oil The aluminum oleate was first dispersed in the molten stearic acid and cocoa butter, and after the dispersion was complete the lecithin was added and thoroughly mixed in.

Comparative tests were then made on a chocolate containing 52.0% cocoa butter using the above mix and lecithin (60–67% in soya oil). Separate batches were prepared and the MacMichael viscosity determined before the addition of any agent. Lecithin in the amount of 0.25% was added to one batch, a like amount of the above mix was added to the other batch, and the viscosity of each determined. An additional .5% of the viscosity reducing agents were then added to the respective batches and the viscosity again measured after which 0.5% of water was added to each batch and the effect of the added water on viscosity measured. The following table gives the results of this test:

Table

| Agent | Viscosity after addition of— | | | |
|---|---|---|---|---|
| | 0.0% | 0.25% | 0.75% | 0.75%+5% H₂O |
| Lecithin (60–67% in soya oil) | Degrees 21.5 | Degrees 20.5 | Degrees 24.0 | Degrees 31.5 |
| 50-50 lec.-al. oleate (60–67% in carrier) | 21.5 | 16.5 | 15.5 | 22.0 |

The above table clearly illustrates the advantages of the mixture over licithin alone. The table shows that the mixture is a more powerful viscosity reducing agent than lecithin alone, and that a greater viscosity reduction is possible with the mixture than is possible with lecithin. For example, when 0.75% lecithin is added the viscosity is increased, while in the case of the mixture a further decrease over that obtained with lesser amounts is obtained. Also the mixture produces a much lower viscosity in chocolate containing small amounts of water than does lecithin. This is of considerable importance in coating ice cream and other materials containing substantial amounts of water, since during the dipping the chocolate takes up small amounts of moisture. In addition the use of the mixture presents no tempering troubles such as is the case when aluminum oleate is used alone.

Thus, by using the mixtures contemplated by the present invention more desirable viscosity reduction is possible than with lecithin, and at the same time the tempering difficulties encountered when the salts are used alone are overcome. Another advantage is that the lecithin may be diluted with a less expensive material, such as the soaps, and at the same time more desirable technical results are obtained. When chocolate is prepared employing the mixture of the present invention, it may be used in any of the ways in which chocolate is used, such as a regular chocolate coating, ice cream coating, etc.

The percentage of the salt added to the lecithin may vary over wide limits, practically any percentage of the salt producing to some degree the desirable results. However, in amounts less than 2% and more than 98% the predominating characteristics of the mixture are those of the major constituent. A mixture containing equal amounts of lecithin and soap has been found to possess very desirable properties. The amount of the mixture used may vary, amounts between 0.01 and 3.0% being ordinarily used, although greater amounts may be used if desired.

The action which takes place when the lecithin or other phosphatide and the salts are mixed is not actually known. It may be that some loose bonding of the salt with the lecithin takes place, but it is not desired to limit the invention to any such theory. In any event the mixture not only has desirable properties not possessed by either alone, but does not possess certain undesirable properties possessed by the individual ingredients.

Having described my invention what I desire to secure by Letters Patent of the United States is:

1. A confection composition of matter comprising a solid comminuted material dispersed in a fatty material, and also containing a proportion of a mixture of a phosphatide and a salt, the positive ion of which is hydrophilic, and the negative ion of which is lipophilic, dispersed therein.

2. A confection composition of matter comprising cacao matter dispersed in a fatty material, and also containing a proportion of a mixture of a phosphatide and a salt, the positive ion of which is hydrophilic, and the negative ion of which is lipophilic, dispersed therein.

3. A confection composition of matter comprising cacao matter dispersed in a fatty material, and also containing a proportion of a mixture comprising a phosphatide and a salt, the positive ion of which is hydrophilic, and the negative ion of which is a lipophilic group selected from the class consisting of the residues of fatty acids, the residues of substituted fatty acids and the residues of the addition products of fatty acids, said fatty acids containing more than six carbon atoms, dispersed therein.

4. A confection composition of matter comprising cacao matter dispersed in a fatty material, and also containing a proportion of a mixture comprising a phosphatide and soap, dispersed therein.

5. A confection composition of matter comprising cacao matter dispersed in a fatty material, and also containing a proportion of a mixture comprising lecithin and soap, dispersed therein.

6. A confection composition of matter comprising cacao matter dispersed in a fatty material, and also containing a proportion of a mixture of lecithin and a water insoluble soap, dispersed therein.

7. A confection composition of matter comprising cacao matter dispersed in cocoa butter, and also containing a proportion of a mixture of lecithin and a soap, dispersed therein.

8. The method of improving a confection composition of the type in which a solid comminuted material is dispersed in a fatty material which comprises dispersing in said composition a proportion of a mixture comprising a phosphatide and a salt, the positive ion of which is hydrophilic, and the negative ion of which is lipophilic.

9. The method of improving a confection composition in which cacao matter is dispersed in a fatty material which comprises dispersing in said composition a proportion of a mixture comprising a phosphatide and a salt, the positive ion of which is hydrophilic, and the negative ion of which is lipophilic.

10. The method of improving a confection composition in which cacao matter is dispersed in a fatty material which comprises dispersing in said composition a mixture comprising a phosphatide and a salt, the positive ion of which is hydrophilic, and the negative ion is a lipophilic group selected from the class consisting of the residues of fatty acids, the residues of substituted fatty acids, and the residues of addition products of fatty acids, said fatty acids containing more than six carbon atoms.

11. The method of improving a confection composition in which cacao matter is dispersed in a fatty material which comprises dispersing in said composition a mixture comprising a phosphatide and a soap.

12. The method of improving a confection composition in which cacao matter is dispersed in a fatty material which comprises dispersing in said composition a mixture comprising lecithin and a soap.

13. The method of improving a confection composition in which cacao matter is dispersed in a fatty material which comprises dispersing in said composition a mixture comprising lecithin and a water insoluble soap.

14. The method of improving chocolate which comprises incorporating in said chocolate from 0.01 to 3% of a mixture comprising lecithin and soap.

15. A chocolate composition comprising cacao matter dispersed in cocoa butter, lecithin and soap, the total amount of lecithin and soap in said composition being between 0.01 and 3.0% of the composition.

16. A composition of matter suitable for reducing the viscosity of confections of the type in which a solid comminuted material is dispersed in a fatty material consisting of a phosphatide and a salt having balanced hydrophilic and lipophilic portions, the hydrophilic portion being the group COOX in which X is a basic atom or group, and the lipophilic portion comprises the aliphatic residue of a fatty acid having more than six carbon atoms, dispersed in a fatty carrier selected from the class consisting of oils, fats, waxes and their fatty acids, the phosphatide being present in amount sufficient to improve the tempering of the confection when added thereto, over that when the same composition but without the phosphatide is added to the confection.

17. The composition of claim 16 in which X is the radical of a metal.

18. The composition of claim 16 in which phosphatide comprises lecithin.

19. The composition of claim 16 in which phosphatide comprises lecithin and the salt is a water insoluble salt in which X is the radical of a metal.

20. The composition of claim 16 in which the phosphatide is soybean phosphatide and X is the radical of a metal, and in which the phosphatide and salt are present in substantially equal quantities.

JOSEPH STANLEY.